(12) United States Patent
Kuo (10) Patent No.: US 10,460,142 B2
(45) Date of Patent: Oct. 29, 2019

(54) BARCODE IDENTIFICATION METHOD FOR IMPROVING DECODING RELIABILITY BY CORRECTING IMAGE DISTORTION

(71) Applicant: QISDA CORPORATION, Taoyuan (TW)

(72) Inventor: Jun-Hao Kuo, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/114,230

(22) Filed: Aug. 28, 2018

(65) Prior Publication Data

US 2019/0080130 A1 Mar. 14, 2019

(30) Foreign Application Priority Data

Sep. 8, 2017 (CN) .......................... 2017 1 0807272

(51) Int. Cl.
*G06K 19/00* (2006.01)
*G06K 7/14* (2006.01)
*G06T 5/00* (2006.01)
*G06K 19/06* (2006.01)

(52) U.S. Cl.
CPC ......... *G06K 7/1473* (2013.01); *G06K 7/1413* (2013.01); *G06K 7/1495* (2013.01); *G06K 19/06028* (2013.01); *G06T 5/002* (2013.01); *G06T 5/003* (2013.01)

(58) Field of Classification Search
USPC ................................ 235/435, 439, 454, 462
See application file for complete search history.

(56) References Cited

U.S. PATENT DOCUMENTS

2006/0180669 A1\* 8/2006 Hara ........................ G06K 7/10
235/462.07
2011/0073650 A1\* 3/2011 Chiou ................ G06K 7/10722
235/462.07

\* cited by examiner

*Primary Examiner* — Matthew Mikels (57) ABSTRACT

A barcode identification method includes generating a binarization barcode by using a binarization process from a sampled barcode, acquiring a first region from the binarization barcode, acquiring a first narrow element width from the first region, acquiring a second region from the binarization barcode, acquiring a second narrow element width from the second region, generating an extension region by extending the second region when the second narrow element width is smaller than the first narrow element width, generating a plurality of binarization sequences corresponding to the extension region, decoding at least one of the binarization sequences for generating at least one decoded sequence by using a lookup table, and verifying the at least one decoded sequence for generating a verified sequence by using a checksum code.

9 Claims, 7 Drawing Sheets

BARCODE IDENTIFICATION METHOD FOR IMPROVING DECODING RELIABILITY BY CORRECTING IMAGE DISTORTION

BACKGROUND OF THE INVENTION

1. Field of the Invention

The present invention illustrates a barcode identification method, and more particularly, a barcode identification method for improving decoding reliability by correcting image distortion.

2. Description of the Prior Art

With the advancement of technologies, various barcodes are gradually adopted in our daily life. Actually, complicated and error-prone text messages are gradually replaced with the barcodes. Particularly, the barcode can be regarded as an image pattern recognition element set in form of several black bars and white spaces with different widths according to a certain coding rule (i.e., ratios of black and white widths) for bearing some useful information. A common barcode is formed by an image pattern including parallel black bars and white spaces for achieving high reflectivity. The barcode can indicate the country which manufactures a product, the manufacturer of the product, the name of the product, the date the product is manufactured, the classification number of a book, starting and ending locations, any type, a certain date, etc. Thus, barcodes are available in many fields of applications such as a commodity circulation, a library management, a postal management, and a banking system.

In general, two processes are required to identify the barcode for generating meaningful information. The first process is called as a barcode sampling process. The barcode sampling process can use a optics device such as a camera, a scanner, or a laser recognition device for capturing a barcode image. The second process is called as a decoding process. The decoding process can use a lookup table or a decoder for acquiring the meaningful information from the sampled barcode. However, when the barcode sampling processes is performed, the scanner can use its own light source for irradiating the barcode. Then, a photoelectric converter can be used for receiving a reflected light signal and converting light regions and dark regions of the reflected light signal into a binarized signal. After the binarized signal is generated, the barcode sampling process is completed.

However, when the barcode sampling process is performed, it may be interfered by external environmental light, noise, and even scanner dust, thereby causing distortion of the sampled barcode image. For example, in the sampled barcode image, widths of black bars and white spaces are easily distorted since the sampled barcode image becomes blurred due to unexpected dust, especially in small barcode size. In other words, since the barcode size is small, the black bars and white spaces are narrow so that they are particularly susceptible to environmental disturbances. When the widths of some black bars or white spaces in the sampled barcode are distorted, decoding failure or unexpected error easily occurs. In other words, when the decoding process is performed, it is lack of using a calibration process for correcting some error image patterns. Therefore, since the conventional decoding process may suffer from environmental interference, a risk of decoding failure is increased.

SUMMARY OF THE INVENTION

In an embodiment of the present invention, a barcode identification method is disclosed. The barcode identification method comprises generating a binarization barcode by using a binarization process from a sampled barcode, acquiring a first region from the binarization barcode, acquiring a first narrow element width from the first region, acquiring a second region from the binarization barcode, acquiring a second narrow element width from the second region, generating an extension region by extending the second region when the second narrow element width is smaller than the first narrow element width, generating a plurality of binarization sequences corresponding to the extension region, decoding at least one of the binarization sequences for generating at least one decoded sequence by using a lookup table, and verifying the at least one decoded sequence for generating a verified sequence by using a checksum code.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
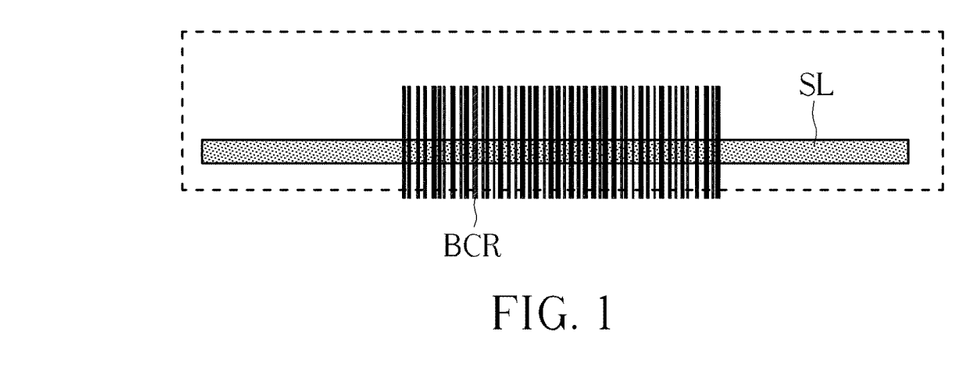
FIG. 1 is an illustration of an operation of a sampling step in a barcode identification method according to an embodiment of the present invention.

FIG. 1 is an illustration of an operation of a sampling step in a barcode identification method according to an embodiment of the present invention. A barcode of the embodiment can be any type of barcode with dual gray level patterns. In other words, some barcode formats such as Code11, Code39, Code128, and PDF147 (i.e., they have different ratios of dark color regions and light color regions widths) currently used can be applied to the barcode identification method of the present invention. In FIG. 1, the barcode BCR can be printed on a surface of an object with ink. A scan line SL can be an optical sensing region of a line sensor array. The scan line SL can be used for sampling the barcode BCR in contact or non-contact mode. Therefore, after the barcode BCR is sampled (hereafter say, "sampled barcode") and then processed by using a binarization method (hereafter say, "binarization barcode BC"), the sampled barcode and the binarization barcode BC are consistent with a size of the scan line SL. However, a designer can also arbitrarily scale a size of the sampling barcode and the binarization barcode BC, such as zooming in or zooming out of a sampled image of the barcode BCR. Any reasonable technology modification falls into the scope of the present invention. Particularly, when the barcode BCR is sampled by using the scan line SL of the line sensor array, unexpected sampling error may be introduced by external environmental light, noise, or scanner dust. For example, dark color bars or light color spaces of the sampled barcode may suffer from grayscale distortion or an image edge blurring effect. In the embodiment, since the barcode can be any type of barcode with dual gray level patterns, in order to avoid redundant gray levels (blurring effect) caused by sampling interference, a binarization method is introduced for processing the sampled barcode. For example, a user-defined gray level threshold or a system default gray level threshold can be used for performing the binarization method. The gray level threshold can be set to a specific gray level between 0 and 255. Each dark color bar (hereafter, say "bar") and light color space (hereafter, say "space") of the sampled barcode can be compared with the gray level threshold. If a gray level of a region is smaller than the gray level threshold, the region can be regarded as a "binarization bar" with a single gray level substantially set to 0. The gray level equal to 0 is called as "a first value" hereafter. If a gray level of a region is greater than the gray level threshold, the region can be regarded as a "binarization space" with a single gray level substantially set to 255. The gray level equal to 255 is called as "a second value" hereafter. Therefore, after the binarization process is performed, the binarization barcode includes only two gray levels. However, when some gray levels of the sampled barcode are severely distorted, even if the binarization processed is used, widths of bars and spaces in the binarization barcode may be incorrect. Therefore, the barcode identification method of the present invention is required for correcting image error of the binarization barcode. Steps and principles of the barcode identification method are described later.

Figure 2:
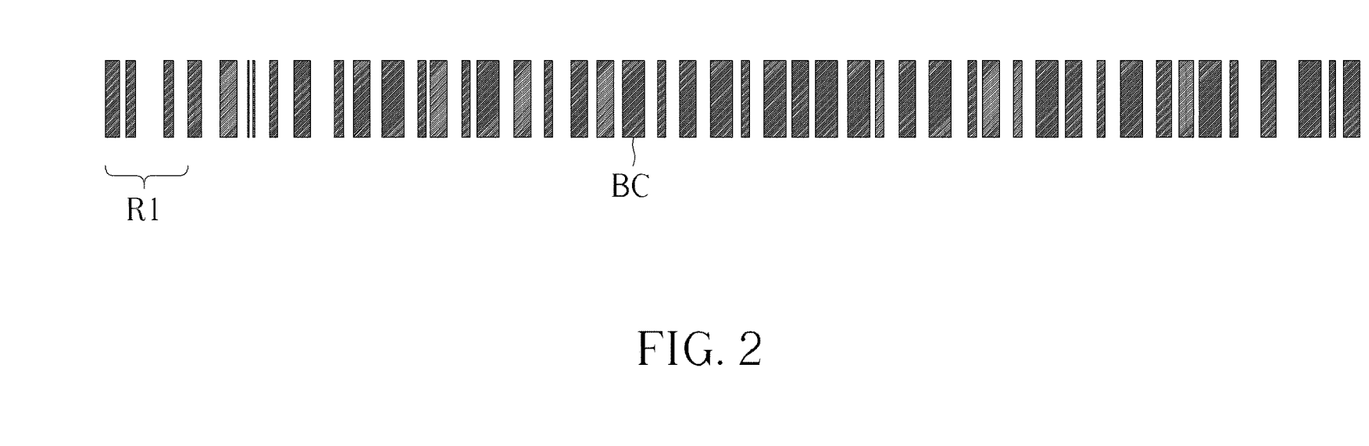
FIG. 2 is an illustration of performing a binarization process from a sampled barcode in the barcode identification method according to the embodiment in FIG. 1.

FIG. 2 is an illustration of performing the binarization process from the sampled barcode in the barcode identification method according to the embodiment. As previously mentioned, the binarization barcode BC is generated after the binarization process of the sampled barcode is performed. The binarization barcode BC includes only two gray levels (i.e., 0 and 255). The binarization barcode BC includes a plurality of first value regions and a plurality of second value regions. The plurality of first value regions and the plurality of second value regions correspond to different gray levels. The number of the plurality of first value regions can be regarded as the number of total bars of the binarization barcode BC. The number of the plurality of second value regions can be regarded as the number of total spaces of the binarization barcode BC. A first region R1 of the binarization barcode BC can be firstly identified. The first region R1 of the binarization barcode BC can be a start pattern region. Specifically, an identification process can be performed by scanning N first value regions and M second value regions from the beginning of the binarization barcode BC. In other words, the first region R1 can be determined when a region includes N first value regions and M second value regions. The N first value regions and the M second value regions are consistent with the format. N and M are two positive integers. For example, when the binarization barcode BC is a barcode with a format as Code 128, a start pattern region is defined as a first region R1 including three bars and three spaces (N=3 and M=3). In other words, in FIG. 2, the first region R1 can be regarded as a certain interval scanned from the beginning of the binarization barcode BC. The certain interval includes three first value regions and three second value regions.

Figure 3:
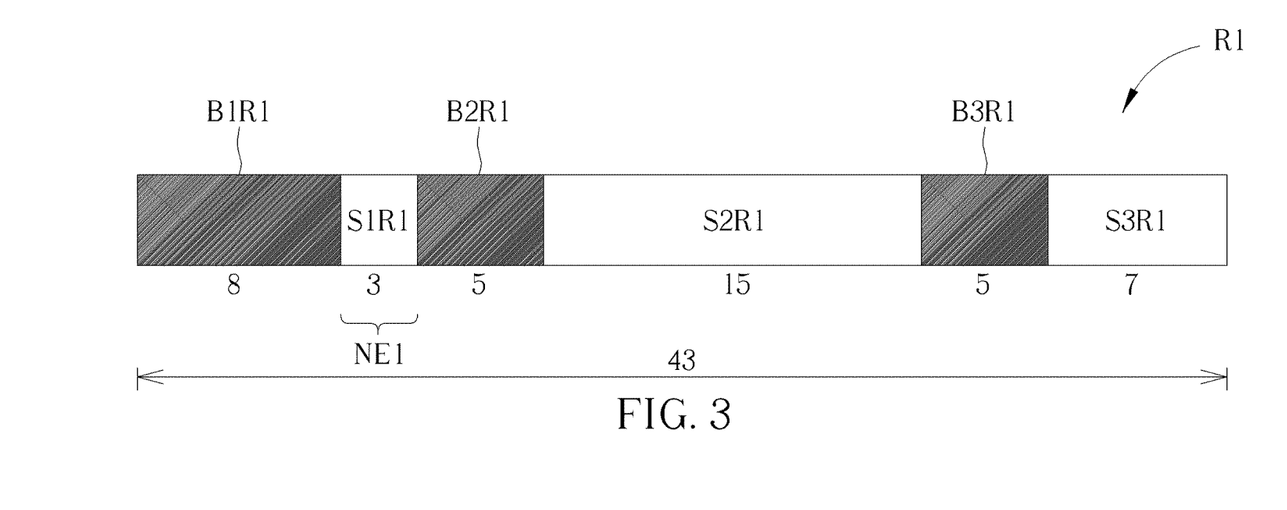
FIG. 3 is an illustration of a first region of a binarization barcode in the barcode identification method according to the embodiment in FIG. 1.

FIG. 3 is an illustration of the first region R1 of the binarization barcode BC in the barcode identification method according to the embodiment. As previously mentioned, the first region R1 includes three first value regions and three second value regions. For example, the first region R1 includes a first value region B1R1 with a width equal to 8, a second value region S1R1 with a width equal to 3, a first value region B2R1 with a width equal to 5, a second value region S2R1 with a width equal to 15, a first value region B3R1 with a width equal to 5, and a second value region S3R1 with a width equal to 7. Therefore, a width of the first region R1 is equal to 43. In FIG. 3, widths of all first value regions and second value regions of the first region R1 can be observed. According to the first value regions and second value regions, a region with a smallest width can be acquired. For example, in FIG. 3, a region S1R1 with a smallest width equal to 3 can be selected from the first value regions (B1R1, B2R1, and B3R1) and the second value regions (S1R1, S2R1, and S3R1). Here, the width of the region S1R1 can be defined as a first narrow element width NE1, which is equal to 3.

Figure 4:
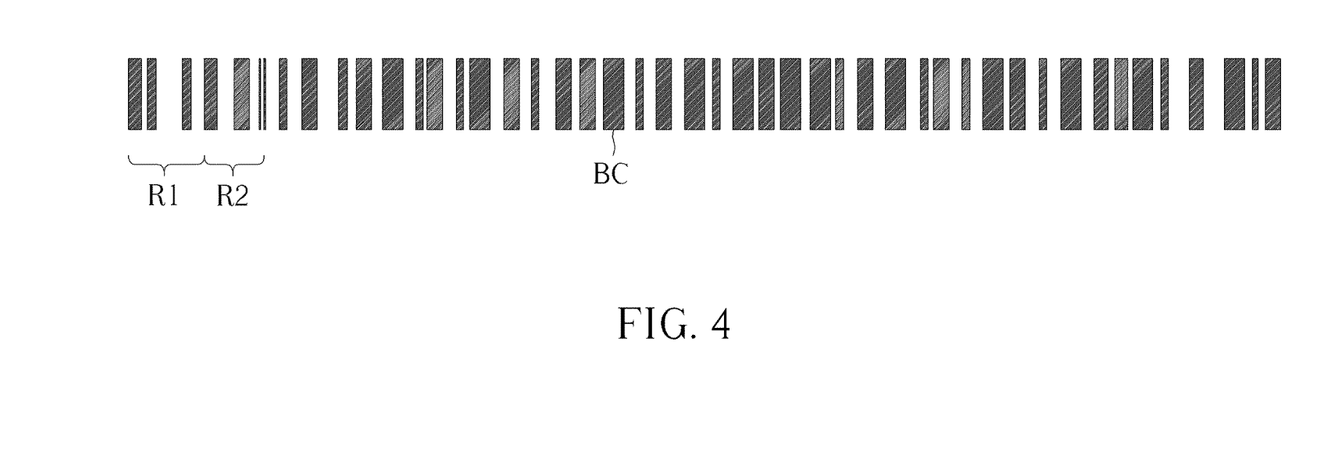
FIG. 4 is an illustration of positions of the first region and a second region of the binarization barcode in the barcode identification method according to the embodiment in FIG. 1.

FIG. 4 is an illustration of positions of the first region R1 and a second region R2 of the binarization barcode BC in the barcode identification method according to the embodiment. After the first narrow element width NE1 is determined, the second region R2 can be determined when a region non-overlapped with the first region R1 (or following the first region R1) is identified to include three first value regions and three second value regions. The second region R2 can be regarded as a barcode data region adjoining the first region R1. However, the second region R2 can be a barcode data region separated with a distance from the first region R1. Here, the first region R1 is located before the second region R2. Particularly, positions of the first region R1 and the second region R2 are relevant to a scanning direction. If the scanning direction is defined as a vector from a left side to a right side of the binarization barcode BC, the first region R1 is located on the left side of the second region R2. If the scanning direction is defined as a vector from the right side to the left side of the binarization barcode BC, the first region R1 is located on the right side of the second region R2. In the embodiment, since the second region belongs to the barcode data region, an error detection function and an error correction function of the second region R2 are performed by using the barcode identification method. A purpose of the barcode identification method is to correct image error of the second region R2 caused by sampling interference. In the following, methods of image validation check and image error correction of the second region R2 are described.

Figure 5:
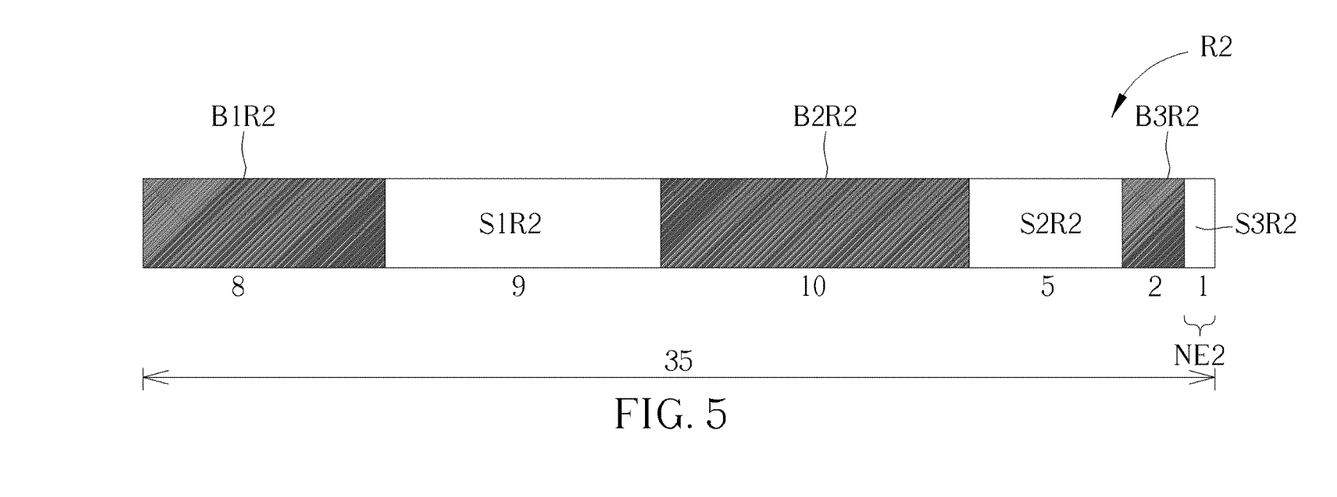
FIG. 5 is an illustration of the second region of the binarization barcode in the barcode identification method according to the embodiment in FIG. 1.

FIG. 5 is an illustration of the second region R2 of the binarization barcode BC in the barcode identification method according to the embodiment. As previously mentioned, the second region R2 includes three first value regions and three second value regions. For example, the second region R2 includes a first value region B1R2 with a width equal to 8, a second value region S1R2 with a width equal to 9, a first value region B2R2 with a width equal to 10, a second value region S2R2 with a width equal to 5, a first value region B3R2 with a width equal to 2, and a second value region S3R2 with a width equal to 1. Therefore, a width of the second region R2 is equal to 35. In FIG. 5, widths of all first value regions and second value regions of the second region R2 can be observed. According to the first value regions and second value regions, a region with a smallest width can be determined. For example, in FIG. 5, a region S3R2 with a smallest width equal to 1 can be selected from the first value regions (B1R2, B2R2, and B3R2) and the second value regions (S1R2, S2R2, and S3R2). Here, the width of the region S3R2 can be defined as a second narrow element width NE2, which is equal to 1. Since the second narrow element width NE2 (value=1) is smaller than the first narrow element width NE1 (value=3), it implies that an error width may occur in the second region R2. Therefore, image distortion may be introduced to the second region R2. In FIG. 5, widths of the first value region B3R2 and the second value region S3R2 are smaller than the first narrow element width NE1. Thus, a location of distorted image can be determined around locations of the first value region B3R2 and the second value region S3R2. Since the second region R2 includes the distorted image, the barcode identification method of the present invention can correct the distorted image, as illustrated below.

Figure 6:
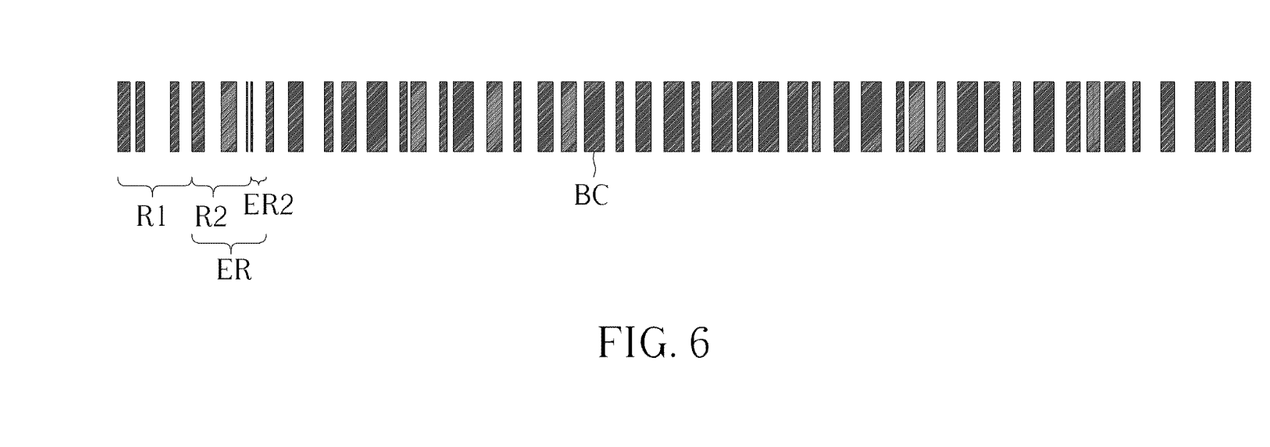
FIG. 6 is an illustration of positions of the first region and an extension region of the binarization barcode in the barcode identification method according to the embodiment in FIG. 1.

FIG. 6 is an illustration of positions of the first region R1 and an extension region ER of the binarization barcode BC in the barcode identification method according to the embodiment. As previously mentioned, the second region R2 can be regarded as the barcode data region adjoining the first region R1. When the second narrow element width NE2 of the second region R2 is smaller than the first narrow element width NE1 of the first region R1, it implies that the second region R2 includes the distorted image. Thus, an additional region ER2 adjoining the second region R2 can be introduced. Here, the additional region ER2 includes one first value region (bar) and one second value region (space). Further, the extension region ER includes the second region R2 and the additional region ER2. In other words, in the embodiments, the second region R2 includes three first value regions and three second value regions. The extension region ER includes four first value regions and four second value regions. Generally, the second region R2 includes N first value regions and M second value regions. The extension region ER includes N+1 first value regions and M+1 second value regions.

Figure 7:
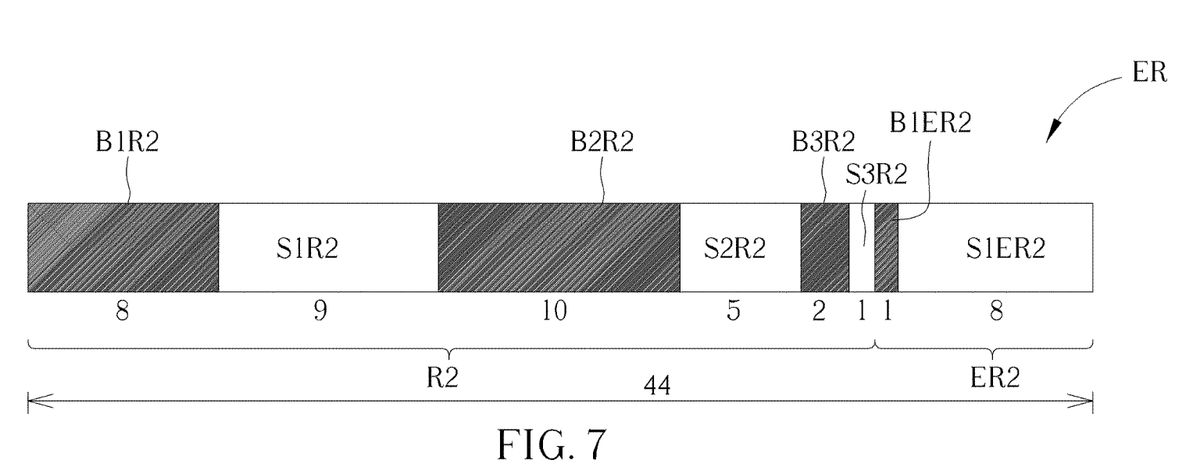
FIG. 7 is an illustration of the extension region of the binarization barcode in the barcode identification method according to the embodiment in FIG. 1.

FIG. 7 is an illustration of the extension region ER of the binarization barcode BC in the barcode identification method according to the embodiment. As previously mentioned, the extension region ER includes four first value regions and four second value regions. For example, the extension region ER includes a first value region B1R2 with a width equal to 8, a second value region S1R2 with a width equal to 9, a first value region B2R2 with a width equal to 10, a second value region S2R2 with a width equal to 5, a first value region B3R2 with a width equal to 2, a second value region S3R3 with a width equal to 1, a first value region B1ER2 with a width equal to 1, and a second value region S1ER2 with a width equal to 8. Therefore, the width of the extension region ER is equal to 44 (i.e., 35+9=44). Since the second narrow element width NE2 is smaller than the first narrow element width NE1, it implies that the second region R2 includes the distorted image. Further, since the widths of the first value region B3R2 (with a width=2) and the second value region S3R2 (with a width=1) are smaller than the first narrow element width NE1. Thus, a location of the distorted image in the second region R2 can be determined around locations of the first value region B3R2 and the second value region S3R2, as illustrated below. When widths of bars and/or spaces are interfered by noise, one possible type of the image distortion may occur. For example, the second value region S3R2 with the second narrow width NE2 having the second value (light color) is located between two consecutive first value regions. As shown in FIG. 7, the width of the second value region (space) S3R2 is too narrow. The second value region S3R2 is located between two consecutive first value regions (bars) B3R2 and B1ER2. Thus, the second value region S3R2 with the second narrow width NE2 can be regarded as a noise image or a distorted image. The second value region S3R2 can be converted to the first value region (bar) so that a gray level between the first value region B3R2 and the first value region B1ER2 is constant. Further, an error image pattern can be corrected by using an opposite operation. For example, when a first value region (bar) with the second narrow element width NE2 is located between two consecutive second value regions (spaces), the first value region with the second narrow element width NE2 can be converted to the second value region (space) so that a gray level between two second value regions is constant. Moreover, the aforementioned image processing rule is only an embodiment for correcting error image. Any reasonable image processing rule can be used for correcting any region with a width smaller than the first narrow element width NE1.

As previously mentioned, in the embodiment, the second region R2 includes three first value regions and three second value regions. However, since image distortion is detected in the second region R2, additional first value region and second value region are introduced to the second region R2 in order to form the extension region ER. The extension region ER initially includes four first value regions and four second value regions. Then, the number of first value regions and the number of second value regions of the extension region ER can be adjusted to be consistent with a format of the sampled barcode in order to generate all possible binarization sequences. In other words, the extension region ER can be adjusted to include three first value regions and three second value regions, which follows the format of Code128. Further, all possible "patterns (bars and spaces)" of the adjusted extension region can be saved in form of binarization sequences. The binarization sequences can be further decoded and verified. In the following, a method for adjusting the number of first value regions and the number of second value regions of the extension region ER are described.

Figure 8:
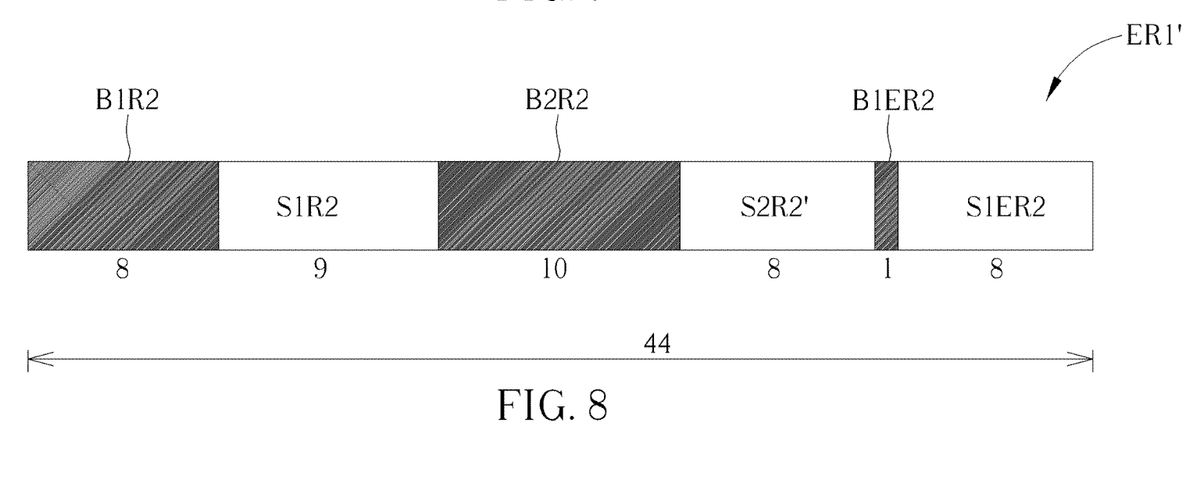
FIG. 8 is an illustration of an adjusted extension region with a first pattern type of the binarization barcode in the barcode identification method according to the embodiment in FIG. 1.

FIG. 8 is an illustration of an adjusted extension region ER1' with a first pattern type of the binarization barcode in the barcode identification method according to the embodiment. In FIG. 7, since a width of the first value region B3R2 is smaller than the first narrow element width NE1 and the first value region B3R2 is located between two second value regions S2R2 and S3R2, the first value region B3R2 can be converted to the second value region (light color region). By doing so, a gray level between the second value region S2R2 and the second value region S3R2 is constant. In other words, an image region from the second value region S2R2 to the second value region S3R2 can be regarded as an "integrated" second value region, denoted as a second value region S2R2' in FIG. 8. In other words, one first value region and one second value region are subtracted from the extension region ER including four first value regions and four second value regions in FIG. 7. Therefore, the adjusted extension region ER1' includes three first value regions and three second value regions. As shown in FIG. 8, the adjusted extension region ER1' includes the first value region B1R2 with a width equal to 8, the second value region S1R2 with a width equal to 9, the first value region B2R2 with a width equal to 10, the second value region S2R2' with a width equal to 8, the first value region B1ER2 with a width equal to 1, and the second value region S1ER2 with a width equal to 8.

Figure 9:
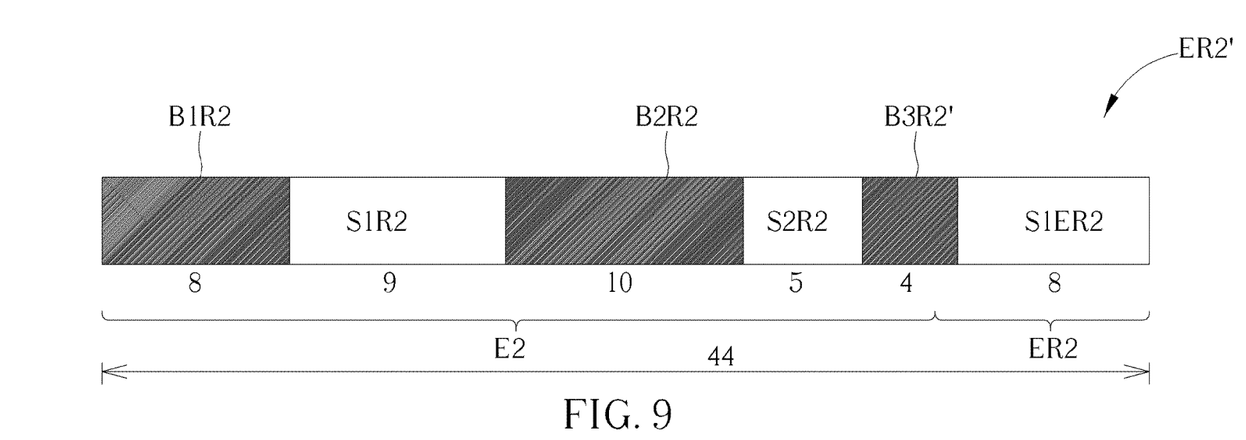
FIG. 9 is an illustration of an adjusted extension region with a second pattern type of the binarization barcode in the barcode identification method according to the embodiment in FIG. 1.

FIG. 9 is an illustration of an adjusted extension region ER2' with a second pattern type of the binarization barcode in the barcode identification method according to the embodiment. In FIG. 7, since a width of the second value region S3R2 is smaller than the first narrow element width NE1 and the second value region S3R2 is located between two first value regions B3R2 and B1ER2, the second value region S3R2 can be converted to the first value region (dark color region). By doing so, a gray level between the first value region B3R2 and the second value region B1ER2 is constant. In other words, an image region from the first value region B3R2 to the first value region B1ER2 can be regarded as an "integrated" first value region, denoted as a first value region B3R2' in FIG. 9. In other words, one first value region and one second value region are subtracted from the extension region ER including four first value regions and four second value regions in FIG. 7. Therefore, the adjusted extension region ER2' includes three first value regions and three second value regions. As shown in FIG. 9, the adjusted extension region ER2' includes the first value region B1R2 with a width equal to 8, the second value region S1R2 with a width equal to 9, the first value region B2R2 with a width equal to 10, the second value region S2R2 with a width equal to 5, the first value region B3R2' with a width equal to 4, and the second value region S1ER2 with a width equal to 8.

Figure 10:
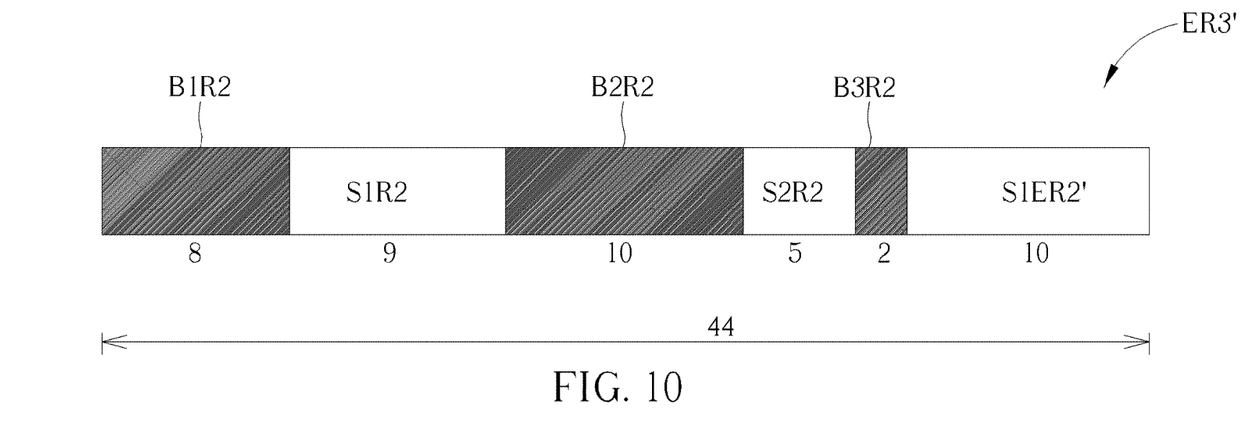
FIG. 10 is an illustration of an adjusted extension region with a third pattern type of the binarization barcode in the barcode identification method according to the embodiment in FIG. 1.

FIG. 10 is an illustration of an adjusted extension region ER3' with a third pattern type of the binarization barcode in the barcode identification method according to the embodiment. In FIG. 7, since a width of the first value region B1ER2 is smaller than the first narrow element width NE1 and the first value region B1ER2 is located between two second value regions S3R2 and S1ER2, the first value region B1ER2 can be converted to the second value region (light color region). By doing so, a gray level between the second value region S3R2 and the second value region S1ER2 is constant. In other words, an image region from the second value region S3R2 to the second value region S1ER2 can be regarded as an "integrated" second value region, denoted as a second value region S1ER2' in FIG. 10. In other words, one first value region and one second value region are subtracted from the extension region ER including four first value regions and four second value regions in FIG. 7. Therefore, the adjusted extension region ER3' includes three first value regions and three second value regions. As shown in FIG. 10, the adjusted extension region ER3' includes the first value region B1R2 with a width equal to 8, the second value region S1R2 with a width equal to 9, the first value region B2R2 with a width equal to 10, the second value region S2R2 with a width equal to 5, the first value region B3R2 with a width equal to 2, and the second value region S1ER2' with a width equal to 10.

The image correction method in FIG. 8 to FIG. 10 is only the embodiment of the present invention. However, locations of the error image and image correction method are not limited to the pattern types in FIG. 8 to FIG. 10. Any reasonable image correction method falls into the scope of the present invention. After the adjusted extension regions ER1' to ER3' in FIG. 8 to FIG. 10 are digitized, a plurality of binarization sequences can be generated. Here, the "binarization sequence" is defined as a digital sequence bearing all widths information of the adjusted extension region in the binarization barcode. For example, a binarization sequence of the adjusted extension region ER1' can be expressed as "8,9,10,8,1,8". A binarization sequence of the adjusted extension region ER2' can be expressed as "8,9,10,5,4,8". A binarization sequence of the adjusted extension region ER3' can be expressed as "8,9,10,5,2,10". These binarization sequences can be regarded as all possible width combinations of the first value regions and the second value regions after the extension region ER is adjusted. Then, at least one of the binarization sequences can be decoded for generating at least one decoded sequence by using a lookup table. In other words, for a binarization sequence, when at least one value of the binarization sequence is inconsistent with the first narrow element width NE1, the binarization sequence is eliminated. For example, under the format of Code128, a narrow element width of any region is required to be greater than 3. Therefore, the aforementioned binarization sequences "8,9,10,8,1,8" and "8,9,10,5,2,10" are eliminated since they have an element smaller than 3 and thus result in decoder failure. Therefore, only the binarization sequence "8,9,10,5,4,8" of the adjusted extension region ER2' is possible of decoding success. Finally, a decoded sequence can be verified for generating a verified sequence by using a checksum code.

Figure 11:
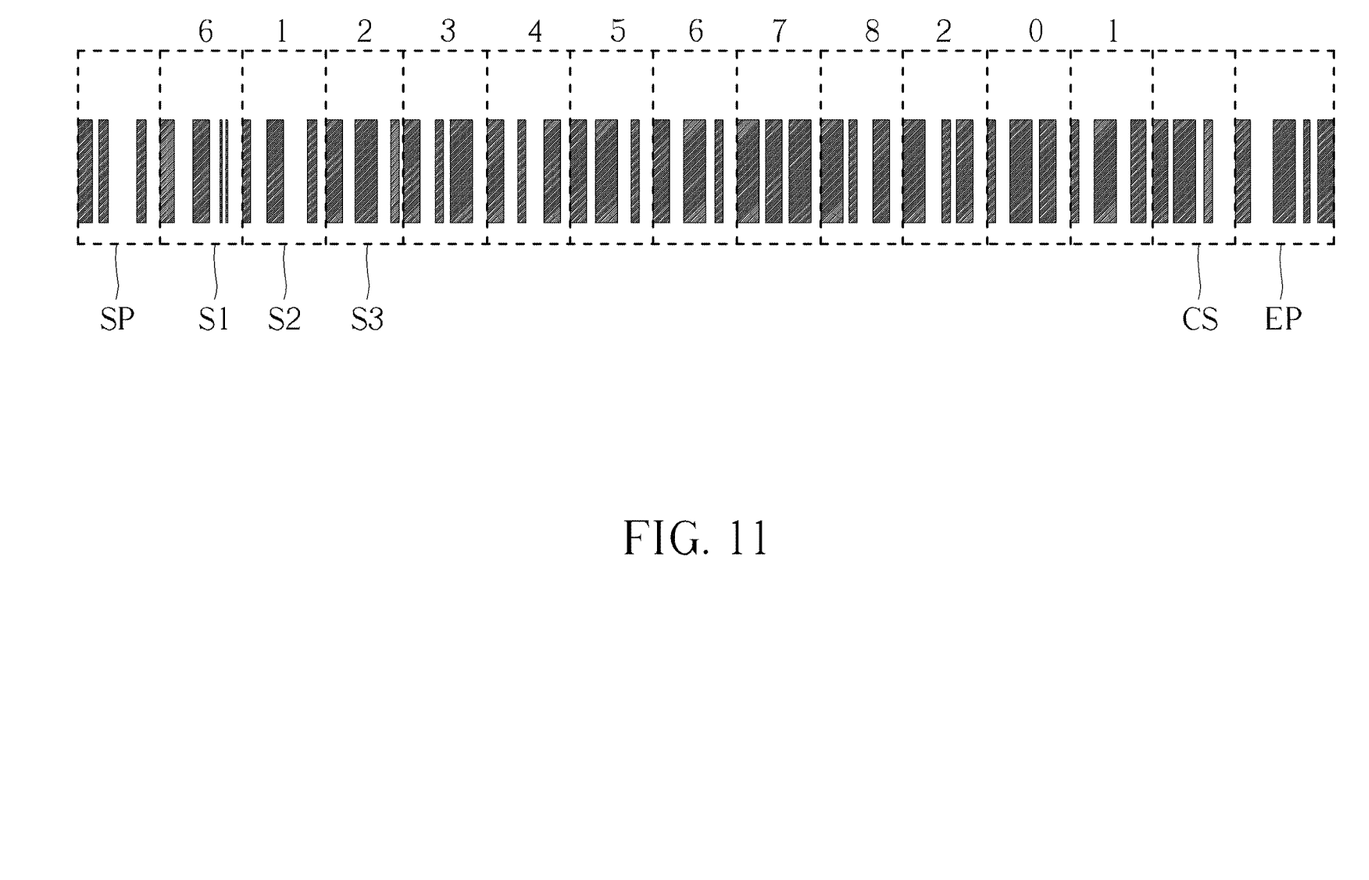
FIG. 11 is an illustration of a segment-based decoding process in the barcode identification method according to the embodiment in FIG. 1.

FIG. 11 is an illustration of a segment-based decoding process in the barcode identification method according to the embodiment. In the embodiment, the first region R1 corresponding to the start pattern region SP of the binarization barcode BC in FIG. 11 can be firstly acquired. Then, the second region R2 following the start pattern region SP of the binarization barcode BC can be analyzed for determining whether the barcode image is distorted or not. When the barcode image of the second region R2 is distorted, the second region R2 can be extended for correcting distorted/error image of the second region R2. In other words, in FIG. 11, a first decoding region S1 following the start pattern region SP of the binarization barcode BC can be regarded as a processed region after the error image is corrected in the second region R2. After the first decoding region S1 is successfully decoded (i.e., a binarization sequence of the first decoding region S1 is decoded as a number "6"), decoding regions S2 and S3 following the decoding region S1 can be decoded sequentially. Finally, all regions between the start pattern region SP and an end pattern region EP of the binarization barcode BC can be decoded. For example, after the binarization barcode BC is decoded and verified by using a checksum code region CS, a verified sequence such as "612345678201" can be generated. Further, the verified sequence can be regarded as meaningful information after the binarization barcode BC completes the decoding process and the verification process. The verified sequence carries valid data of the barcode, such as the country which manufactures a product, the manufacturer of the product, the name of the product, the date the product is manufactured, the classification number of a book, starting and ending locations, any type, or a certain date.

Figure 12:
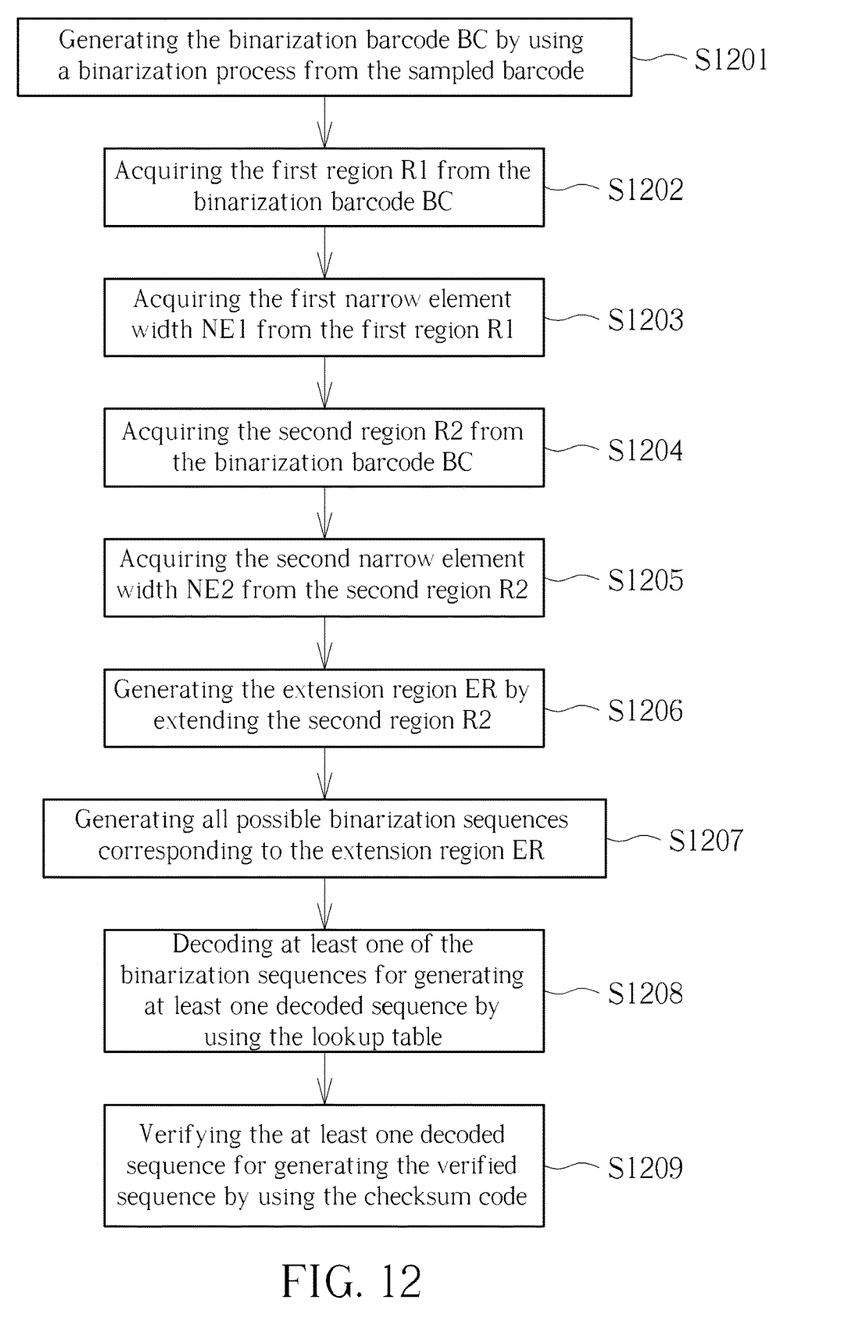
FIG. 12 is a flow chart of the barcode identification method according to the embodiment in FIG. 1.

FIG. 12 is a flow chart of the barcode identification method according to the embodiment. The barcode identification method includes step S1201 to step S1209. Any reasonable modification falls into the scope of the present invention. Step S1201 to step S1209 are illustrated below.

step:S1201: generating the binarization barcode BC by using a binarization process from the sampled barcode;
step:S1202: acquiring the first region R1 from the binarization barcode BC;
step:S1203: acquiring the first narrow element width NE1 from the first region R1;
step:S1204: acquiring the second region R2 from the binarization barcode BC;
step:S1205: acquiring the second narrow element width NE2 from the second region R2;
step:S1206: generating the extension region ER by extending the second region R2;
step:S1207: generating all possible binarization sequences corresponding to the extension region ER;
step:S1208: decoding at least one of the binarization sequences for generating at least one decoded sequence by using the lookup table;
step:S1209: verifying the at least one decoded sequence for generating the verified sequence by using the checksum code.

Step S1201 to step S1209 are previously illustrated. Thus, their illustrations are omitted here. By using the barcode identification method including step S1201 to step S1209, error patterns caused by some image distortions can be corrected. For example, an image distortion of a space region between two bar regions can be corrected when a width of the space region is too narrow. Also, an image distortion of a bar region between two space regions can be corrected when a width of the bar region is too narrow. Therefore, a barcode decoding reliability can be improved.

To sum up, the present invention discloses a barcode identification method. The start pattern region is firstly detected as a reference region. By using the start pattern region, all regions following the start pattern region can be detected sequentially for determining whether an image distortion has occurred or not. When an image pattern on a certain location is distorted or interfered by noise, it can be corrected by using adjacent image patterns (i.e., adjacent bar regions or adjacent space regions). Therefore, the barcode identification method of the present invention is capable of correcting image error. Since the barcode identification method is capable of correcting image error, when the barcode is decoded, it can against image distortion caused by external environment interference, thereby increasing a decoding success rate. In other words, comparing with conventional identification methods, the barcode identification method of the present invention provides high decoding success rate and high decoding reliability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A barcode identification method comprising:
generating a binarization barcode by using a binarization process from a sampled barcode;
acquiring a first region from the binarization barcode;
acquiring a first narrow element width from the first region;
acquiring a second region from the binarization barcode;
acquiring a second narrow element width from the second region;
generating an extension region by extending the second region when the second narrow element width is smaller than the first narrow element width;
generating a plurality of binarization sequences corresponding to the extension region;
eliminating a binarization sequence of the plurality of binarization sequences when at least one value of the binarization sequence is inconsistent with the first narrow element width;
decoding at least one of the binarization sequences for generating at least one decoded sequence by using a lookup table; and
verifying the at least one decoded sequence for generating a verified sequence by using a checksum code.

2. The method of claim 1, wherein the first region and the second region are non-overlapped, the binarization barcode comprises a plurality of first value regions and a plurality of second value regions, and the plurality of first value regions and the plurality of second value regions correspond to different gray levels.

3. The method of claim 2, further comprising:
acquiring a format of a barcode to be sampled;
wherein the first region comprises N first value regions and M second value regions, the N first value regions and the M second value regions are consistent with the format, and N and M are two positive integers.

4. The method of claim 2, wherein generating the extension region by extending the second region when the second narrow element width is smaller than the first narrow element width comprises:
generating the extension region by adding a first value region and a second value region to the second region.

5. A barcode identification method comprising:
generating a binarization barcode by using a binarization process from a sampled barcode;
acquiring a first region from the binarization barcode;
acquiring a first narrow element width from the first region;
acquiring a second region from the binarization barcode;
acquiring a second narrow element width from the second region;
generating an extension region by adding a first value region and a second value region to extend the second region when the second narrow element width is smaller than the first narrow element width;
converting the second value region of the extension region to the first value region of the extension region when a width of the second value region of the extension region is equal to the second narrow element width and the second value region of the extension region is located between two consecutive first value regions;
generating a plurality of binarization sequences corresponding to the extension region;
decoding at least one of the binarization sequences for generating at least one decoded sequence by using a lookup table; and verifying the at least one decoded sequence for generating a verified sequence by using a checksum code;

wherein the first region and the second region are non-overlapped, the binarization barcode comprises a plurality of first value regions and a plurality of second value regions, and the plurality of first value regions and the plurality of second value regions correspond to different gray levels.

6. A barcode identification method comprising:

generating a binarization barcode by using a binarization process from a sampled barcode;

acquiring a first region from the binarization barcode;

acquiring a first narrow element width from the first region;

acquiring a second region from the binarization barcode;

acquiring a second narrow element width from the second region;

generating an extension region by adding a first value region and a second value region to extend the second region when the second narrow element width is smaller than the first narrow element width;

converting the first value region of the extension region to the second value region of the extension region when a width of the first value region of the extension region is equal to the second narrow element width and the first value region of the extension region is located between two consecutive second value regions;

generating a plurality of binarization sequences corresponding to the extension region;

decoding at least one of the binarization sequences for generating at least one decoded sequence by using a lookup table; and verifying the at least one decoded sequence for generating a verified sequence by using a checksum code;

wherein the first region and the second region are non-overlapped, the binarization barcode comprises a plurality of first value regions and a plurality of second value regions, and the plurality of first value regions and the plurality of second value regions correspond to different gray levels.

7. The method of claim 1, further comprising:

adjusting number of first value regions and number of second value regions of the extension region to be consistent with a format of a barcode to be sampled;

wherein the binarization sequences are generated by combining the first value regions and the second value regions of the extension region.

8. The method of claim 1, wherein the first region is a barcode start pattern region, and the second region is a barcode data region.

9. The method of claim 1, further comprising:

scanning a barcode to generate the sampled barcode by using a line sensor array.

* * * * *